United States Patent [19]

Dominguez

[11] Patent Number: 4,513,133

[45] Date of Patent: Apr. 23, 1985

[54] REACTION INJECTION MOLDED ELASTOMERS CONTAINING LOW MOLECULAR WEIGHT ORGANIC ACIDS

[75] Inventor: Richard J. G. Dominguez, Austin, Tex.

[73] Assignee: Texaco Inc., White Plains, N.Y.

[21] Appl. No.: 579,234

[22] Filed: Feb. 13, 1984

[51] Int. Cl.$^3$ .................. C08G 18/34; C08G 18/48; C08G 18/50

[52] U.S. Cl. .................. 528/49; 528/48; 528/76; 528/77; 264/331.19

[58] Field of Search .................. 528/48, 49, 76, 77; 521/903

[56] References Cited

U.S. PATENT DOCUMENTS

| | | | |
|---|---|---|---|
| 3,087,900 | 4/1963 | Brown | 260/2.5 |
| 3,087,901 | 4/1963 | Brown | 260/2.5 |
| 3,179,625 | 4/1965 | Ehrhart | 260/75 |
| 3,637,542 | 1/1972 | Doerge et al. | 260/2.5 AJ |
| 3,639,307 | 2/1972 | Doerge et al. | 260/2.5 AJ |
| 3,838,076 | 9/1974 | Moss et al. | 521/163 |
| 4,067,834 | 1/1978 | Olstowski | 260/18 TN |
| 4,111,861 | 9/1978 | Godlewski | 521/123 |
| 4,246,363 | 1/1981 | Turner et al. | 521/163 |
| 4,254,069 | 3/1981 | Dominguez | 521/914 |
| 4,269,945 | 5/1981 | Vanderhider et al. | 521/159 |
| 4,272,618 | 6/1981 | Dominguez et al. | 521/160 |
| 4,376,834 | 3/1983 | Goldwasser et al. | 521/160 |
| 4,379,100 | 4/1983 | Salisbury et al. | 521/110 |
| 4,396,729 | 8/1983 | Dominquez et al. | 521/51 |
| 4,433,067 | 2/1984 | Rice et al. | 521/51 |
| 4,444,910 | 4/1984 | Rice et al. | 521/51 |

*Primary Examiner*—Herbert S. Cockeram
*Attorney, Agent, or Firm*—Jack H. Park; Kenneth R. Priem; David L. Mossman

[57] ABSTRACT

The invention relates to reaction injection molded elastomers of improved green strength containing polyurea linkages derived from high molecular weight amine terminated polyethers, a chain extender, a polyisocyanate and a low molecular weight organic acid. The reaction injection molded (RIM) elastomers of this invention are useful, for example, as automobile body parts.

24 Claims, No Drawings

REACTION INJECTION MOLDED ELASTOMERS CONTAINING LOW MOLECULAR WEIGHT ORGANIC ACIDS

CROSS-REFERENCES TO RELATED APPLICATIONS

This application is related to Ser. No. 579,236; Ser. No. 579,235 and Ser. No. 579,231, all filed of even date.

BACKGROUND OF THE INVENTION

1. Field of the Invention

This invention concerns the field of reaction injection molded elastomers.

2. Description of Other Publications in the Field

U.S. Pat. Nos. 4,254,069 and 4,272,618 where I am a co-inventor concern the curing of RIM polyurethane elastomers. In the Glossary of these patents, a "polyol" is defined as a di- or greater functionality high molecular weight alcohol or an amine terminated molecule composed of ether groups. In the discussion of chain extenders in these patents, low molecular weight hydroxyl terminated molecules; e.g., ethylene glycol, are disclosed. However, the actual examples are of polyether polyurethanes using polyols (hydroxyl terminated) of high molecular weight. The chain extenders, ethylene glycol and monoethanolamine, were used as crosslinkers.

U.S. Pat. No. 3,838,076 discloses foams made from amine terminated polyethers, wherein the amine termination ranges from 10 to 50 percent.

Turner's U.S. Pat. No. 4,246,363 claims a RIM polyurethane composition derived from using at least three different active hydrogen containing materials having specific relationships and reactivity and solubility parameters to one another. Examples 22 and 23 of Turner use JEFFAMINE ® D-2000, diethylene glycol and the reaction product of one mole of aminoethylethanolamine with three moles of propylene oxide.

U.S. Pat. No. 4,379,100 describes a polyurethane RIM process wherein the carboxyl function internal mold release agents mentioned hereinafter are used. See, for example, column 4, lines 34–43.

U.S. Pat. No. 4,396,729 describes RIM processes and materials made from high molecular weight amine terminated polyethers (used in this invention), amine terminated chain extenders, polyisocyanates and internal mold release agents such as those mentioned in U.S. Pat. No. 4,379,100.

U.S. Pat. No. 4,376,834 describes "polyurethane" materials prepared from amine terminated polyethers, hydroxyl terminated chain extenders and polyisocyanates.

Also, Vanderhider's U.S. Pat. No. 4,269,945 claims a process for preparing RIM polyurethanes wherein a relatively high molecular weight hydroxyl containing polyol, a chain extender and a polyisocyanate are used. The chain extender may be an aliphatic amine containing material having at least one primary amine group.

SUMMARY OF THE INVENTION

The invention is a reaction injection molded (RIM) elastomer comprising a cured reaction product of ingredients comprising primary or secondary amine terminated polyethers of at least 2,500 molecular weight having greater than 50% of their active hydrogens in the form of amine hydrogens, a chain extender, an aromatic polyisocyanate and a low molecular weight organic acid. The invention is also a method of preparation of a RIM elastomer as described above.

DESCRIPTION OF THE PREFERRED EMBODIMENTS

The amine terminated polyethers useful in this invention include primary and secondary amine terminated polyether polyols of at least 2,500 average molecular weight having from 2 to 6 functionality, preferably from 2 to 3. Mixtures of amine terminated polyethers may be used. In a preferred embodiment the amine terminated polyethers have an average molecular weight of at least 4,000. An especially preferred embodiment uses amine terminated polyethers with an average molecular weight of at least about 5,000.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups in the amine group. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared may then be reductively aminated as outlined, for example, in U.S. Pat. No. 3,654,370, which is incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The chain extenders useful in this invention include low molecular weight linear diols such as 1,4-butane diol, propylene glycol and ethylene glycol. Ethylene glycol is especially preferred. Other chain extenders, including cyclic diols such as 1,4-cyclohexane diol would also be suitable as chain extenders in the practice of this invention. These chain extenders may be used alone or in combination.

The aromatic amine terminated chain extenders useful in this invention include, for example, 1-methyl-3,5-diethyl-2-6 diaminobenzene (both of these materials are also called diethyltoluene diamine or DETDA), 1,3,5-triethyl-2,6 diaminobenzene, 3,5,3',5'-tetraethyl-4,4" diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued January 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

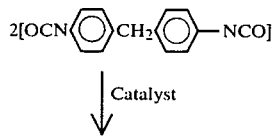

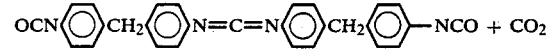

Carbodiimide

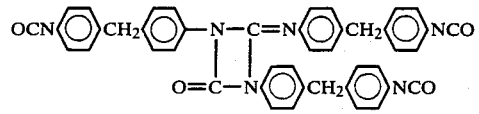

Uretonimine

Examples of commercial materials of this type are Upjohn's ISONATE ® 125 M (pure MDI) and ISONATE 143 L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

The low molecular weight organic acids useful in this invention include those of the formula:

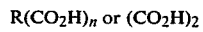

where $R = H$ or contains from 1 to 9-n carbon atoms and $n = 1-3$. R may be aliphatic (linear or branched), cycloaliphatic, aralkyl, alkaryl. R may contain other functional groups such as hydroxyl, cyano, nitro, thiol, halo, ether, ester and carbon-carbon unsaturation.

Examples of useful low molecular weight organic acids include:

a. aliphatic monofunctional acids such as acetic, butyric, isobutyric, n-valeric, trimethylacetic, caproic, caprylic, trichloroacetic, β-chloropropionic, lactic, glycolic, methoxyacetic, thioglycolic, cyanoacetic, acrylic, methacrylic, vinylacetic, neopentanoic, etc., b. aliphatic multifunctional acids such as oxalic, malonic, succinic, glutaric, adipic, pimelic, suberic, azelaic, malic, itaconic, citric, tartaric, maleic, c. aromatic acids such as benzoic, phthalic, terephthalic, salicylic, isophthalic, toluic, chlorobenzoic, bromobenzoic, nitrobenzoic, p-hydroxybenzoic, gallic, anisic and syringic.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

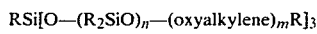

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other mineral fibers are useful.

Post curing of the elastomer of the invention is desirable. Post curing will improve some properties such as heat sag. Employment of post curing depends on the desired properties of the end product.

The examples which follow exemplify the improvement obtained by the process of this invention. However, these examples are not intended to limit the scope of the invention.

Each of the example formulations which follow were processed on an Accuratio VR-100 high pressure impingement mixing RIM machine. The impingement mixing pressures were about 2,000 psi and the material was injected into a steel flat plaque mold after mixing. The mold is milled to produce plaques which are $18'' \times 18'' \times \frac{1}{8}''$. The mold temperature is typically 150°–160° F.

EXAMPLE 1

A RIM elastomer of the following formulation was formed in a mold after injection by a RIM machine:

| B-Component | |
|---|---|
| JEFFAMINE ® T-5000, pbw | 42.2 |
| Diethyltoluene diamine (DETDA), pbw | 17.7 |
| Dow-Corning Q2-7119 fluid, pbw | 0.7 |
| Oxalic acid, pbw | 0.14 |
| A-Component | |
| Upjohn Code 231, pbw | 72.7 |

The above elastomer had a hot tear of 8.5 lbs which was better than the identical elastomer without the oxalic acid (5.4 lbs). Thus, it had better "green strength".

EXAMPLE 2

A RIM elastomer of the following formulation was formed in a mold after injection by a RIM machine:

| B-Component | |
|---|---|
| JEFFAMINE T-5000, pbw | 42.2 |
| DETDA, pbw | 17.7 |
| Salicylic acid, pbw | 0.14 |
| A-Component | |
| Upjohn Code 231, pbw | 73.7 |

The above elastomer had a hot tear of 8.3 lbs which was better than the identical elastomer without the salicyclic acid (7.0 lbs). Thus, it had better green strength.

EXAMPLE 3

An elastomer identical to that in Example 2 except that the salicyclic acid was replaced with acetic acid was produced. It had a hot tear of 8.9 lbs which was better than the identical elastomer without the acetic acid (7.0 lbs). Thus, it had better "green strength".

EXAMPLE 4

An elastomer that was identical with the elastomer in Example 2 except that the salicyclic acid was replaced by itaconic acid was produced. This elastomer had a hot tear of 8.6 lbs which was better than the identical elastomer without the itaconic acid which had a hot tear of 7.0 lbs. Thus it had better "green strength".

EXAMPLE 5

An elastomer that is identical with the elastomer in Example 2 except that the salicyclic acid was replaced by adipic acid was produced. This elastomer had a hot tear of 9.2 lbs. which was better than the identical elastomer without the adipic acid which had a hot tear of 7.0 lbs. Thus it had better "green strength".

EXAMPLE 6

An elastomer identical with the elastomer of Example 2 except that the salicyclic acid was replaced by 0.07 pbw sulfuric acid was produced. No improvement in hot tear was observed.

EXAMPLE 7

An elastomer identical with the elastomer of Example 2 except that the salicyclic acid was replaced by phosphoric acid was produced. No improvement in hot tear was observed.

GLOSSARY

JEFFAMINE ® T-5000—Propylene oxide triamine of about 5,000 molecular weight.

Upjohn Code 231—A quasi-prepolymer consisting of a 1:1 by weight blend of THANOL ® SF-5505 and ISONATE ® 143 L MDI type isocyanate.

THANOL ® SF-5505—A 5500 molecular weight polyether triol containing approximately 80% primary hydroxyl groups.

ISONATE ® 143 L—Pure MDI isocyanate modified so that it is a liquid at ambient temperatures. A product of the Upjohn Co.

I claim:

1. A reaction injection molded elastomer comprising the reaction product of ingredients comprising primary or secondary amine terminated polyethers of at least 2,500 molecular weight having greater than 50% of their active hydrogens in the form of amine hydrogens, a chain extender, an aromatic polyisocyanate and a low molecular weight organic acid in an amount effective to provide improved green strength, represented by the formulae:

where R=H or contains from 1 to 9-n carbon atoms and n=1-3.

2. An elastomer as in claim 1 wherein the chain extender is amine terminated.

3. An elastomer as in claim 1 wherein the organic acid is acetic.

4. An elastomer as in claim 1 wherein the organic acid is salicylic.

5. An elastomer as in claim 1 wherein the organic acid is oxalic.

6. An elastomer as in claim 1 wherein the organic acid is itaconic.

7. An elastomer as in claim 1 wherein the organic acid is adipic.

8. A reaction injection molded elastomer comprising the reaction product of ingredients comprising primary or secondary amine terminated polyethers of greater than 4,000 molecular weight having greater than 50% of their active hydrogens in the form of amine hydrogens, a chain extender, an aromatic polyisocyanate and a low molecular weight organic acid in an amount effective to provide improved green strength, represented by the formulae:

$$R(CO_2H)_n \text{ or } (CO_2H)_2$$

where R=H or contains from 1 to 9-n carbon atoms and n=1-3.

9. An elastomer as in claim 8 wherein the chain extender is amine terminated.

10. An elastomer as in claim 8 wherein the organic acid is acetic.

11. An elastomer as in claim 8 wherein the organic acid is salicylic.

12. An elastomer as in claim 8 wherein the organic acid is oxalic.

13. An elastomer as in claim 8 wherein the organic acid is itaconic.

14. An elastomer as in claim 8 wherein the organic acid is adipic.

15. A reaction injection molded elastomer comprising the reaction product of ingredients comprising primary or secondary amine terminated polyethers of greater than 5,000 molecular weight having greater than 50% of their active hydrogens in the form of amine hydrogens, a chain extender, an aromatic polyisocyanate and a low molecular weight organic acid in an amount effective to provide improved green strength, represented by the formulae:

$$R(CO_2H)_n \text{ or } (CO_2H)_2$$

where R=H or contains from 1 to 9-n carbon atoms and n=1-3.

16. An elastomer as in claim 15 wherein the chain extender is amine terminated.

17. An elastomer as in claim 15 wherein the organic acid is acetic.

18. An elastomer as in claim 15 wherein the organic acid is salicylic.

19. An elastomer as in claim 15 wherein the organic acid is oxalic.

20. An elastomer as in claim 15 wherein the organic acid is itaconic.

21. An elastomer as in claim 15 wherein the organic acid is adipic.

22. A method for making a reaction injection molded elastomer comprising reacting in a closed mold ingredients comprising primary or secondary amine terminated polyethers of at least 2,500 molecular weight having greater than 50% of their active hydrogens in the form of amine hydrogens, a chain extender, an aromatic polyisocyanate and a low molecular weight organic acid in an amount effective to provide improved green strength, represented by the formulae:

$$R(CO_2H)_n \text{ or } (CO_2H)_2$$

where R=H or contains from 1 to 9-n carbon atoms and n=1-3.

23. A method for making a reaction injection molded elastomer comprising reacting in a closed mold ingredients comprising primary or secondary amine terminated polyethers of greater than 4,000 molecular weight having greater than 50% of their active hydrogens in the form of amine hydrogens, a chain extender, an aromatic polyisocyanate and a low molecular weight organic acid in an amount effective to provide improved green strength, represented by the formulae:

$$R(CO_2H)_n \text{ or } (CO_2H)_2$$

where R=H or contains from 1 to 9-n carbon atoms and n=1-3.

24. A method for making a reaction injection molded elastomer comprising reacting in a closed mold ingredients comprising primary or secondary amine terminated polyethers of greater than 5,000 molecular weight having greater than 50% of their active hydrogens in the form of amine hydrogens, a chain extender, an aromatic polyisocyanate and a low molecular weight organic acid in an amount effective to provide improved green strength, represented by the formulae:

$$R(CO_2H)_n \text{ or } (CO_2H)_2$$

where R=H or contains from 1 to 9-n carbon atoms and n=1-3.

* * * * *